Aug. 8, 1967 S. YANDO 3,335,299

FERROELECTRIC PULSE GENERATOR

Filed Dec. 30, 1964

INVENTOR.
STEPHEN YANDO
BY R. J. Frank
ATTORNEY.

United States Patent Office 3,335,299

Patented Aug. 8, 1967

3,335,299

FERROELECTRIC PULSE GENERATOR

Stephen Yando, Huntington, N.Y., assignor to General Telephone and Electronics Laboratories, Inc., a corporation of Delaware Filed Dec. 30, 1964, Ser. No. 422,112
6 Claims. (Cl. 310—9.8)

ABSTRACT OF THE DISCLOSURE

A pulse generator employing a ferroelectric wafer having an electrode on each face. The electrodes initially clamp the ferroelectric material when a voltage is applied. One of the electrodes comprises a number of closely spaced electrode segments which results in a sequential relaxation of the restraining forces and the sequential generation of pulses at the segments.

This invention relates to a ferroelectric pulse generator.

The high magnitude acoustic pulses utilized in electroluminescent display devices of the type disclosed in my U.S. Patent 3,132,276 may be readily generated by the use of an energy conversion system as disclosed in my copending patent application Ser. No. 183,229 filed Mar. 28, 1962, now U.S. Patent 3,243,648.

In these devices, the display device comprises generally a rectangular piezoelectric sheet having a rectangular electroluminescent layer affixed to one surface thereof. Lead terminations are provided at the edges of the piezoelectric sheet to absorb unwanted acoustic waves. First and second groups of parallel spaced input electrodes are secured to the surface of the piezoelectric sheet between adjoining sides of the electroluminescent layer and their respective terminations with an additional grounded electrode being secured to the other surface of the sheet. A voltage generator is used to sequentially energize each of the input electrodes in a group, the interval between application of the excitation voltages to adjacent input electrodes being equal to the time required for an acoustic wave or pulse to travel between these electrodes. When a rapidly changing voltage, hereinafter referred to as a step, is applied between the first and common electrodes, a mechanical strain is produced in the piezoelectric sheet causing an acoustic wave or pulse to be transmitted toward the other electrodes in the group. As the acoustic wave arrives at the second input electrode, a voltage step is applied to this second electrode thereby increasing the magnitude of the acoustic wave and the electric field associated therewith. In this way, the electric field intensity is increased each time the acoustic wave traverses an input electrode.

At the point underlying the electroluminescent layer where the waves from each group of electrodes intersect, the electric field is of greatest magnitude and a spot of light is produced. By the use of the sequentially energized spaced electrode configuration, the brightness of the light is substantially increased over that previously attained by the use of a single electrode.

However, while the voltage generators employed to provide the necessary sequential energization of electrodes for bright output signals are generally satisfactory they are also relatively complex. Briefly, the voltage generator so used comprises a trigger generator which periodically couples trigger pulses to a number of pulse forming circuits, each of which in turn energizes a particular electrode.

The number of pulse forming circuits employed is equal to the number of electrodes in a single group. The individual pulse forming circuits consisted of a plurality of electrical components, namely, a multivibrator, a differentiator, a clipper, and a transducer drive generator. Due in part to the number of elements employed therein, the timing relations between pulse forming circuits must be adjusted at intervals during continuous operation.

Accordingly, it is an object of the present invention to provide an improved sequential pulse generator.

Another object is to provide a pulse generator wherein the relative timing of the output pulses is maintained substantially constant during continuous operation.

Still another object is to provide a ferroelectric pulse generator having relatively few electrical components.

Yet another object is to provide a sequential pulse generator which may be used in combination with a sequentially excited piezoelectric-electroluminescent display device.

In accordance with the present invention, a wafer of ferroelectric material is provided with first and second electrodes on its opposing faces. When a voltage is applied across the ferroelectric material, the relation between the polarization of the material and the applied voltage is hysteretic in nature. In other words, the application of a voltage across the ferroelectric material and the subsequent removal thereof does not restore the material to its initial state but in fact leaves the material partially polarized.

Generally, the application of a sufficiently high voltage to the first and second electrodes saturates the ferroelectric material so that all the electric dipoles therein are aligned by the electric field existing between electrodes. The slope of the polarization versus applied voltage characteristics of the material at this point defines the saturated dielectric constant of the material.

The spontaneous polarization of a ferroelectric crystal is associated with a dimensional change within the crystal. This is due to the shift of one of the atoms of a unit cell to a second stable position thereby changing the cell dimensions. Thus, the application of a voltage across a ferroelectric crystal produces a significant dimensional change. However, clamping the ferroelectric crystal by restraining dimensional change prevents spontaneous polarization so that the crystal appears to have a relatively low dielectric constant.

By subsequently removing the clamping while maintaining the applied voltage, polarization takes place with an accompanying charge flow. This charge flow results in a current being produced in an external electrode circuit. It is seen therefore that the application of a voltage to the electrodes of a clamped single crystal ferroelectric material provides an external current when the clamping is removed and spontaneous polarization is permitted to take place.

In a preferred embodiment the first and second electrodes are circular, substantially equal in area and mounted in an aligned position on opposing faces of the ferroelectric wafer. The second electrode consists of a plurality of individual annular electrode segments electrically isolated from one another by suitable radial spacing. Each of said individual electrode segments is in turn coupled to a corresponding external load.

When a step voltage is applied across the first and second electrodes, the electric field tends to polarize that portion of the ferroelectric material situated therebetween. However, it has been found that adjacent portions of ferroelectric material exhibit mutual restraining forces which inhibit the rapid change of dimension necessary for the flow of polarization charge.

In order to insure the presence of the mutual restraining forces within the ferroelectric material underlying the second electrode, the radial spacing of the annular electrode segments is maintained small in respect to the thickness of the ferroelectric wafer and the width of the electrode segments. By so spacing the electrodes, the electric field between the first electrode and the annular electrode segments also exists in the portion of ferroelectric material underlying the spaces between adjacent electrode segments. In practice it has been found that the desired mutual restraint is present when the spacing of adjacent electrode segments does not exceed thirty percent of the thickness of the ferroelectric wafer or the width of the electrode segments.

The initial strain due to dimensional change appears at the peripheral region of the electrodes. As this region undergoes a dimensional charge, the restraint on the adjacent ferroelectric material is removed. In this manner, the strain propagates toward the center of the electrode region at the velocity of sound. This allows, in rapid succession, the polarization of material under successive electrode segments. The flow of polarization charge results in a pulse of current flowing in the individual electrode circuits. If the external loads are capacitive, the pulses of current so produced charge the capacitors with the outputs thereacross being a plurality of successive step voltages spaced in time.

The output steps of this ferroelectric pulse generator are separated in time according to the width and spacing of the individual electrodes. This interval can be selected to be equal to the interval between energization of the adjacent input electrode segments of the aforementioned display device. Thus, the output signals of the ferroelectric pulse generator are well suited for sequentially energizing the input electrodes of these devices.

Further features and advantages of the present invention will become more readily apparent from the following description of specific embodiments thereof when taken in conjunction with the accompanying drawings in which.

Figures 1, 2, 3, 4, 5:
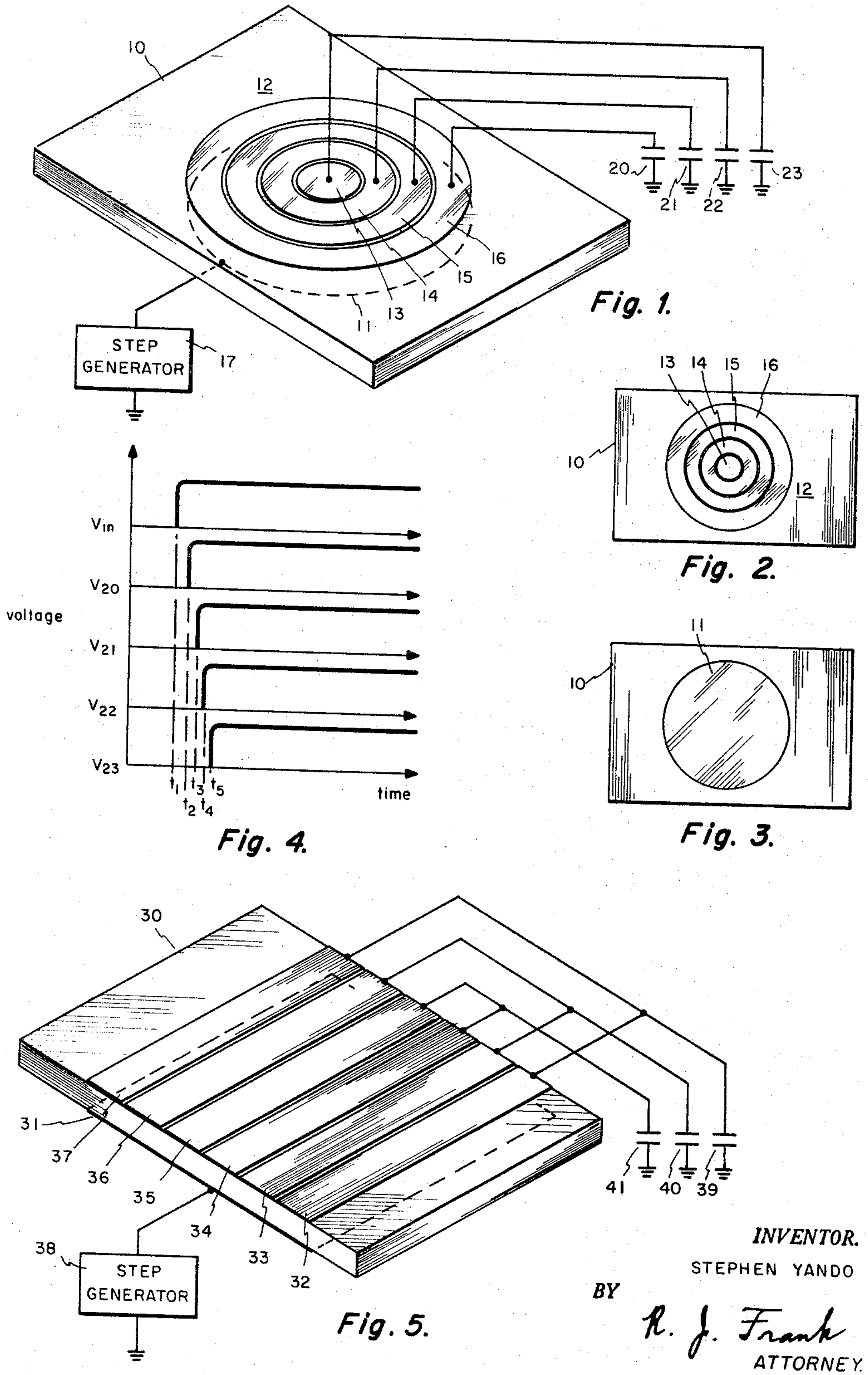
FIG. 1 is a perspective view of one embodiment of the invention.
FIG. 2 is a top view of the embodiment shown in FIG. 1.
FIG. 3 is a bottom view of the embodiment shown in FIG. 1.
FIG. 4 is a diagram showing the waveforms associated with the invention.
FIG. 5 is a perspective view of a second embodiment of the invention.

Referring more particularly to FIG. 1, a wafer 10 of single crystal ferroelectric material, such as barium titanate ($BaTiO_3$), is provided with first and second electrodes 11 and 12. First electrode 11, shown mounted on the underside of wafer 10, is a circular metallic electrode. Second metallic electrode 12 is mounted on the opposing face of ferroelectric wafer 10 and comprises a plurality of individual concentric annular electrode segments 13, 14, 15 and 16 as seen in FIG. 2. First and second electrodes 11 and 12 have substantially equal areas and are mounted in an aligned manner on wafer 10.

Individual electrode segments 13, 14, 15, 16 are of equal radial thickness and are concentrically spaced from each other. The spacing is selected to be about one-tenth of the radial thickness and serves to provide electrical isolation therebetween. In practice, it has been found advantageous to use relatively small radial spacing to prevent degradation of the mutual restraint between adjacent electrodes. However, the spacing should not exceed thirty percent of either the thickness of wafer 10 or the width of the electrodes to insure that the material thereunder is initially strained when a voltage is applied between electrodes 11 and 12. Although second electrode 12 is shown comprising four individual electrode segments, the number of electrodes may be either increased or decreased depending on the number of output signals desired.

Connected to the individual electrode segments 13, 14, 15 and 16 are load capacitors 20, 21, 22 and 23 respectively each having one end connected to ground. Step generator 17 which may be a conventional multivibrator, is coupled between first electrode 11 and ground. At time $t_1$, as shown in FIG. 4, the step voltage $V_{in}$ is applied to electrode 11 by step generator 17. This results in a substantially step voltage appearing across capacitor 20 at time $t_2$. The delay between the application of voltage $V_{in}$ and the first output voltage $V_{20}$ is due to the time required for the alignment of the dipoles in the portion of ferroelectric wafer 10 that is relatively free of mechanical restraints.

At time $t_2$, the portion of ferroelectric wafer 10 residing between the outermost electrode segment 16 and first electrode 11 has undergone polarization and no longer restrains the adjacent material under electrode 15. As a result of the inward movement of strain, current pulses due to the spontaneous polarization of the ferroelectric material between electrode segments result in voltages progressively appearing across the load capacitors 20, 21, 22 and 23. The sequential output waveforms for the load capacitors are shown in FIG. 4. By employing resistive loads in place of the capacitors, the pulses of polarization current produce corresponding output voltage pulses thereacross.

In one embodiment tested and operated, the ferroelectric wafer was formed of single-crystal barium titanate having a thickness of 4 mils with silver electrodes thereon. The individual electrode segments comprising second electrode 12 were chosen to have a radial thickness of 10 mils and a radial spacing of 1 mil. The time interval between the voltages appearing at successive load capacitors was found to be of the order of 0.04 microsecond and the magnitude of the sequential output steps were found to be 135 volts for a 150 volt input step.

Although the foregoing description was in reference to an annular electrode configuration, the embodiment shown in FIG. 5 utilizes rectangular electrodes. The second electrode comprises a plurality of spaced rectangular electrode segments 32, 33, 34, 35, 36 and 37 mounted on one surface of ferroelectric wafer 30.

First electrode 31 is mounted on the opposing face of wafer 30 and is connected to step generator 38. The individual electrode segments are spaced to provide electrical isolation and mutual restraint and together comprise a second electrode having a contact area substantially equal to first electrode 31.

Individual electrode segments 32 and 37, 33 and 36, 34 and 35 are connected in parallel to capacitive loads 39, 40, and 41 respectively. When a step voltage is supplied to first electrode 31 by generator 38, spontaneous polarization occurs initially in the ferroelectric material underlying the outermost electrode segments 32 and 37. This in turn relieves the restraint of the edge portions of their adjacent electrode segments 33 and 36 permitting this portion of ferroelectric wafer 30 to undergo the dimensional change necessary for polarization. As a result of the progressive movement of strain inward from edge electrode segments 32 and 37, current pulses sequentially charge capacitive loads 39, 40, and 41 in that order. The voltages appearing thereacross may be supplied to energize the previously described piezoelectric-electroluminescent device.

While the above detailed description has been in reference to two embodiments of the invention, it is readily apparent that many modifications and departures may be made therefrom without departing from the spirit or scope of the invention.

What is claimed is:

1. A ferroelectric pulse generator for providing a plurality of output signals which are spaced in time in response to a single input signal comprising (a) a ferroelectric wafer, (b) a first electrode mounted on one surface of said ferroelectric wafer, (c) a second electrode mounted on an opposing surface of said ferroelectric wafer, said second electrode having an area substantially equal to that of said first electrode and comprising a plurality of spaced adjacent individual electrode segments, the spacing between adjacent segments not exceeding thirty percent of either the thickness of said ferroelectric wafer or the width of said electrode segments, and (d) means coupled to said first electrode and to the individual electrode segments comprising said second electrode for applying an input signal therebetween, the ferroelectric material underlying the outermost electrode segments becoming polarized initially to permit the resulting strain to travel inwardly and thereby sequentially remove the mutual restraint provided by said electrode segments, the sequential polarization providing a plurality of output currents spaced in time at said second electrode.

2. A ferroelectric pulse generator for providing a plurality of output signals which are spaced in time in response to a single input signal comprising (a) a ferroelectric wafer, (b) a first electrode mounted on one surface of said ferroelectric wafer, (c) a second electrode mounted on an opposing surface of said ferroelectric wafer, said second electrode having an area substantially equal to that of said first electrode means and comprising a plurality of spaced adjacent individual electrode segments, the spacing between adjacent segments not exceeding thirty percent of either the thickness of said ferroelectric wafer or the width of said electrode segments.

(d) an impedance coupled to said second electrode and to a reference terminal, and (e) input means coupled to said first electrode means and to said reference terminal for supplying an input signal thereto, the portion of said ferroelectric wafer underlying said individual electrode segments becoming sequentially polarized, a plurality of output voltages spaced in time appearing across said impedance means.

3. A ferroelectric pulse generator for providing a plurality of output signals which are spaced in time in response to a single input signal comprising (a) a ferroelectric wafer, (b) a first circular electrode mounted on one face of said wafer, (c) a second circular electrode mounted on the opposing face of said wafer in alignment with said first electrode, said second electrode having an area substantially equal to that of said first electrode and comprising a plurality of spaced adjacent circular electrode segments, the spacing between adjacent segments not exceeding thirty percent of either the thickness of said ferroelectric wafer or the width of said electrode segments, and (d) means coupled to said first and second electrode for applying an input signal therebetween, the portions of said ferroelectric wafer underlying said electrode segments becoming sequentially polarized at each of said electrode segments.

4. A ferroelectric pulse generator for providing a plurality of output signals which are spaced in time in response to a single input signal comprising (a) a ferroelectric wafer, (b) a first circular electrode mounted on one face of said wafer, (c) a second circular electrode mounted on the opposing face of said wafer in alignment with said first electrode, said second electrode means having an area equal to that of said first electrode and comprising a plurality of closely spaced adjacent circular electrode segments, the spacing between adjacent segments not exceeding thirty percent of either the thickness of said ferroelectric wafer or the width of said electrode segments, (d) a plurality of impedances individually connected to a corresponding circular electrode segment and to a reference terminal, and (e) connected to said first electrode means and to said reference terminal for applying an input signal thereto, the output signals appearing across said plurality of impedances comprising a plurality of output voltages spaced in time.

5. A ferroelectric pulse generator for providing a plurality of output signals which are spaced in time in response to a single input signal comprising (a) a ferroelectric wafer, (b) a first circular electrode mounted on one face of said wafer, (c) a second circular electrode mounted on the opposing face of said wafer in alignment with said first electrode, said second electrode having an area equal to that of said first electrode and comprising a plurality of closely spaced adjacent circular electrode segments, the spacing between adjacent segments not exceeding thirty percent of either the thickness of said ferroelectric wafer or the width of said electrode segments, (d) a plurality of capacitors individually connected to a corresponding circular electrode of said second electrode and to a reference terminal, and (e) generating means connected to said first electrode and to said reference terminal for applying a step voltage therebetween, the output signal appearing across said plurality of capacitors comprising a plurality of step voltages spaced in time.

6. A ferroelectric pulse generator for providing a plurality of output signals which are spaced in time in response to a single input signal comprising (a) a ferroelectric wafer, (b) a first rectangular electrode mounted on one face of said wafer, (c) a second rectangular electrode mounted on the opposing face of said wafer in alignment with said first electrode, said second electrode having an area equal to that of said first electrode and comprising a plurality of closely spaced adjacent rectangular electrode segments, the spacing between adjacent segments not exceeding thirty percent of either the thickness of said ferroelectric wafer or the width of said electrode segments, and (d) means coupled to said first and second electrode means for applying an input signal thereacross, the output signal of said second electrode comprising a plurality of output currents spaced in time.

References Cited

UNITED STATES PATENTS

| | | | |
|---|---|---|---|
| 2,967,956 | 1/1961 | Dranetz | 340—10 |
| 3,154,720 | 10/1964 | Cooperman | 310—8 |
| 3,243,648 | 3/1966 | Yando | 310—9.8 |

MILTON O. HIRSHFIELD, *Primary Examiner.*

J. D. MILLER, *Assistant Examiner.*